US011430600B2

(12) United States Patent
Paolucci (10) Patent No.: US 11,430,600 B2
(45) Date of Patent: Aug. 30, 2022

(54) SEGMENTED WINDING CENTER-TAP TECHNIQUES FOR A COUPLED INDUCTOR CIRCUIT

(71) Applicant: Analog Devices International Unlimited Company, Limerick (IE)

(72) Inventor: Jonathan Paolucci, Santa Clara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 175 days.

(21) Appl. No.: 16/851,815

(22) Filed: Apr. 17, 2020

(65) Prior Publication Data

US 2021/0327633 A1    Oct. 21, 2021

(51) Int. Cl.
*H01F 27/28*    (2006.01)
*H02M 3/335*    (2006.01)

(52) U.S. Cl.
CPC .... *H01F 27/2804* (2013.01); *H02M 3/33576* (2013.01); *H01F 2027/2819* (2013.01)

(58) Field of Classification Search
CPC ......... H01F 27/2804; H01F 2027/2819; H01F 27/40; H02M 3/33576
See application file for complete search history.

(56) References Cited

U.S. PATENT DOCUMENTS

| 4,058,758 A | 11/1977 | Peterson |
| 6,091,616 A | 7/2000 | Jacobs et al. |
| 7,129,784 B2 | 10/2006 | Bhatti et al. |
| 7,298,238 B1 | 11/2007 | Eaton et al. |
| 7,332,993 B1 | 2/2008 | Nussbaum |
| 7,576,607 B2 | 8/2009 | Lee et al. |

(Continued)

FOREIGN PATENT DOCUMENTS

| CN | 103141021 B | 9/2015 |
| CN | 105720824 A | 6/2016 |

(Continued)

OTHER PUBLICATIONS

"International Application Serial No. PCT/EP2021/059499, International Search Report dated Jul. 30, 2021", 5 pgs.

(Continued)

*Primary Examiner* — Adolf D Berhane
*Assistant Examiner* — Afework S Demisse
(74) *Attorney, Agent, or Firm* — Schwegman Lundberg & Woessner, P.A.

(57) ABSTRACT

Techniques are provided for a multiple-layer planar transformer having center taps of a segmented winding. In an example, a multiple-layer planar transformer can be a coupled inductor circuit including a first winding comprising a conductive coil having an electrical path defining and encircling the central axis, a second winding configured to magnetically couple with the first winding, the second winding having a plurality of individual segments, wherein each individual segment forms a fraction of one turn of the second winding, and a first output inductor coupled to a first common node of the second winding. The first common node can directly couple a first node of a first individual segment of the plurality of individual segments with a first node of a second individual segment of the plurality of individual segments.

18 Claims, 8 Drawing Sheets

(56) References Cited

U.S. PATENT DOCUMENTS

| | | | |
|---|---|---|---|
| 7,915,989 | B2 | 3/2011 | Li et al. |
| 7,915,991 | B2 | 3/2011 | Waffenschmidt et al. |
| 7,940,152 | B1 | 5/2011 | Kim et al. |
| 7,944,296 | B1 | 5/2011 | Lee et al. |
| 8,044,732 | B2 | 10/2011 | Kessel et al. |
| 8,068,355 | B1 | 11/2011 | Ikriannikov et al. |
| 8,725,085 | B2 | 5/2014 | Darabi et al. |
| 8,842,410 | B2 | 9/2014 | Chan |
| 9,379,629 | B2 | 6/2016 | Chandrasekaran |
| 11,195,655 | B2 | 12/2021 | Paolucci |
| 2004/0017276 | A1 | 1/2004 | Chen et al. |
| 2006/0066431 | A1 | 3/2006 | Anand et al. |
| 2006/0120116 | A1 | 6/2006 | Lipcsel et al. |
| 2006/0019751 | A1 | 9/2006 | Chandrasekaran |
| 2007/0103941 | A1 | 5/2007 | Liu et al. |
| 2007/0152795 | A1 | 7/2007 | Zeng et al. |
| 2009/0109710 | A1 | 4/2009 | Nakahori |
| 2011/0215865 | A1 | 9/2011 | Nam et al. |
| 2014/0153294 | A1 | 6/2014 | Deboy et al. |
| 2016/0020016 | A1* | 1/2016 | Ouyang .......... H02M 1/10 363/21.04 |
| 2016/0164505 | A1* | 6/2016 | Naaman .......... H03K 3/38 327/528 |
| 2017/0085183 | A1 | 3/2017 | Notsch |
| 2017/0271073 | A1 | 9/2017 | Zeng et al. |
| 2017/0310228 | A1 | 10/2017 | Nakajima et al. |
| 2018/0069485 | A1 | 3/2018 | Hsiao et al. |
| 2019/0229633 | A1 | 7/2019 | Perreault et al. |
| 2020/0135390 | A1 | 4/2020 | Paolucci |
| 2021/0327634 | A1 | 10/2021 | Liang et al. |

FOREIGN PATENT DOCUMENTS

| | | |
|---|---|---|
| CN | 111091957 | 5/2020 |
| CN | 113541498 A | 10/2021 |
| EP | 0050432 A1 | 4/1982 |
| EP | 0302162 A2 | 2/1989 |
| GB | 2445677 A | 7/2008 |
| JP | 4149915 B2 | 7/2008 |
| JP | 2010045127 | 2/2010 |
| TW | I220994 B | 9/2004 |
| TW | 201421886 A | 6/2014 |
| TW | 202017297 | 5/2020 |
| WO | WO-2013107782 A2 | 7/2013 |

OTHER PUBLICATIONS

"International Application Serial No. PCT/EP2021/059499, Written Opinion dated Jul. 30, 2021", 10 pgs.

"Taiwanese Application Serial No. 110113212, Voluntary Amendment filed Jul. 5, 2021", w/English Claims, 55 pgs.

"European Application Serial No. 21164527.0, Extended European Search Report dated Sep. 9, 2021", 14 pgs.

"European Application Serial No. 19202178.0, Response filed Oct. 23, 2020 to Extended European Search Report dated Apr. 6, 2020", 18 pgs.

"European Application Serial No. 19202178.0, Communication Pursuant to Article 94(3) EPC dated Nov. 23, 2020", 6 pgs.

"U.S. Appl. No. 16/169,338, Final Office Action dated Jan. 21, 2021", 27 pgs.

"U.S. Appl. No. 16/169,338, Response filed Mar. 17, 2021 to Final Office Action dated Jan. 21, 2021", 19 pgs.

"U.S. Appl. No. 16/169,338, Advisory Action dated Mar. 25, 2021", 3 pgs.

"European Application Serial No. 19202178.0, Response filed Mar. 17, 2021 to Communication Pursuant to Article 94(3) EPC dated Nov. 23, 2020", 12 pgs.

"U.S. Appl. No. 16/169,338, Response filed Apr. 21, 2021 to Advisory Action dated Mar. 25, 2021", 19 pgs.

"U.S. Appl. No. 16/169,338, Examiner Interview Summary dated Apr. 22, 2021", 3 pgs.

"U.S. Appl. No. 16/169,338, Notice of Allowance dated May 27, 2021", 8 pgs.

"U.S. Appl. No. 16/169,338, Examiner Interview Summary dated Apr. 28, 2020", 3 pgs.

U.S. Appl. No. 16/169,338, filed Oct. 24, 2018, Segmented Winding Techniques for a Coupled Inductor Circuit.

U.S. Appl. No. 16/851,880, filed Apr. 17, 2020, Techniques for a Coupled Inductor Circuit.

"U.S. Appl. No. 16/169,338, Response filed May 11, 2020 to Final Office Action dated Apr. 13, 2020", 11 pgs.

"U.S. Appl. No. 16/169,338, Non Final Office Action dated Jun. 9, 2020", 19 pgs.

"U.S. Appl. No. 16/169,338, Response filed Oct. 9, 2020 to Non Final Office Action dated Jun. 9, 2020", 13 pgs.

"U.S. Appl. No. 16/169,338, Final Office Action dated Apr. 13, 2020", 20 pgs.

"U.S. Appl. No. 16/169,338, Non Final Office Action dated Sep. 30, 2019", 21 pgs.

"U.S. Appl. No. 16/169,338, Response filed Dec. 30, 2019 to Non Final Office Action dated Sep. 30, 2019", 11 pgs.

"European Application Serial No. 19202178.0, Extended European Search Report dated Apr. 6, 2020", 11 pgs.

"U.S. Appl. No. 16/169,338, Notice of Allowance dated Oct. 20, 2021", 9 pgs.

"Taiwanese Application Serial No. 110113212, Office Action dated Feb. 17, 2022", 10 pgs.

* cited by examiner

SEGMENTED WINDING CENTER-TAP TECHNIQUES FOR A COUPLED INDUCTOR CIRCUIT

TECHNICAL FIELD

This application provides techniques for coupled inductor circuits for DC-DC voltage converters or regulators.

BACKGROUND

DC-DC switching regulators, as the name applies, use high-frequency switching to generate a desired output voltage for an electronic device. In certain applications, the demand for low voltage electronics to accept relatively high supply voltages creates design challenges for stepping down the supply voltage to a low supply voltage. The same, or very similar, design challenges can also be found in step-up applications where a high supply voltage is converted from a low input supply voltage.

SUMMARY OF THE DISCLOSURE

Techniques are provided for a multiple-layer planar transformer having center taps of a segmented winding. In an example, a multiple-layer planar transformer can be a coupled inductor circuit including a first winding comprising a conductive coil having an electrical path defining and encircling the central axis, a second winding configured to magnetically couple with the first winding, the second winding having a plurality of individual segments, wherein each individual segment forms a fraction of one turn of the second winding, and a first output inductor coupled to a first common node of the second winding. The first common node can directly couple a first node of a first individual segment of the plurality of individual segments with a first node of a second individual segment of the plurality of individual segments.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor(s) have recognized techniques for planar transformers, or planar coupled inductor circuits, that can employ segmented windings to reduce the size, and complexity of certain step-down and step-up transformers for DC-to-DC voltage converters compared to conventional techniques. In certain examples, planar transformers of the present subject matter can reduce the complexity of new designs such as the planar transformer designs of Paolucci, U.S. patent application Ser. No. 16/169,338, titled "SEGMENTED WINDING TECHNIQUES FOR A COUPLED INDUCTOR CIRCUIT", filed Oct. 24, 2018, which is hereby incorporated by reference in its entirety. In addition, the present subject matter provides an architecture that allows for higher switching frequencies that can result in reduced voltage stress across the output inductors. The combination of higher switching frequency and lower voltage stress across the output inductors can provide a significant reduction in ripple current through the output inductors and can allow for use of air core output inductors which can provide significant benefits compared to using metal core inductors. Such benefits can include, but are not limited to, lower cost, lower weight, smaller size, or combination thereof.

Figure 1:
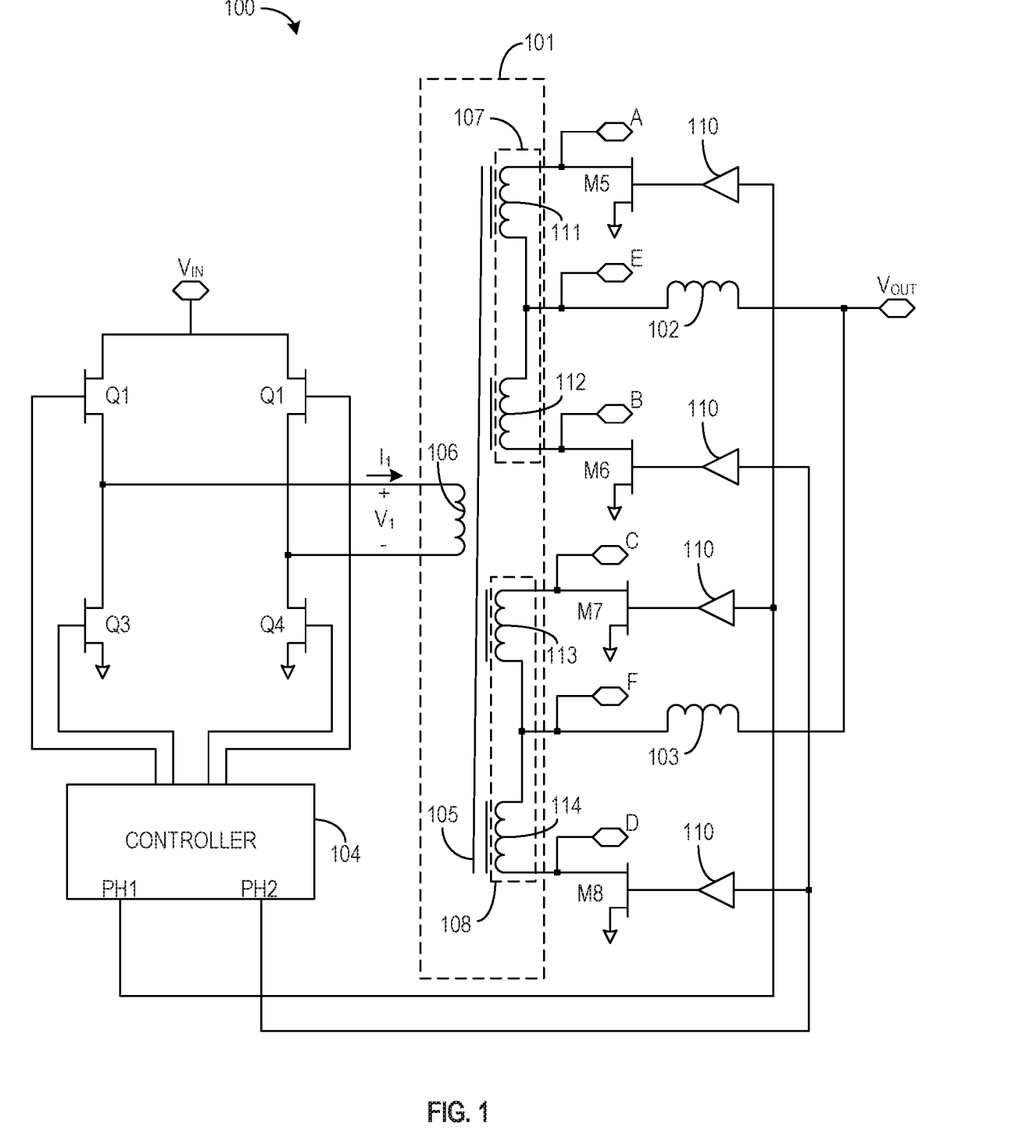
FIG. 1 illustrates generally a schematic of an example planar transformer system according to the present subject matter.

FIG. 1 illustrates generally a schematic of an example planar transformer system 100 according to the present subject matter. The planar transformer system 100 can include a planar transformer 101, a first set of switches (Q1-Q4), a second set of switches (M5-M8), output inductors 102, 103 and a controller 104. In some examples, each switch of the second set of switches can have an optional gate driver 110. The planar transformer 101 can include a core 105, a first winding 106, and one or more second windings 107, 108. The first winding 106 can include a number of turns and typically can include more than one turn. Each second winding 107, 108 can include a number of winding segments 111, 112, 113, 114. Each winding segment 111, 112, 113, 114 can form less than one turn of a second winding 107, 108. In certain examples, each winding segment can form significantly less than one turn of a second winding. In some examples, at least two or more winding segments are required to provide a single turn of one of the second windings. In some examples, each winding segment can represent an integer fraction of a single turn of the second winding, such as ½ of one turn, or ⅓ of one turn, or ¼ of one turn, etc. As used herein, a winding segment includes the primary conductive portion of a turn of a second winding and does not include ancillary parts of the second winding such as an external terminal, a fuse, a switch, etc.

As used herein, the first winding can be either a primary winding of the planar transformer or a secondary winding of the planar transformer. For this document, the first winding 106 is referenced as a primary winding unless noted otherwise. The first set of switches (Q1-Q4) are controlled by the controller and operate to periodically connect and disconnect the primary winding 106 to voltage supply rails and to establish a cyclical primary voltage across the first winding 106 and a cyclical primary current through the first winding 106. The second windings 107, 108 are magnetically coupled to the first winding 106 via the core 105. The core 105 can be an air core or a metal core.

Figure 3A:
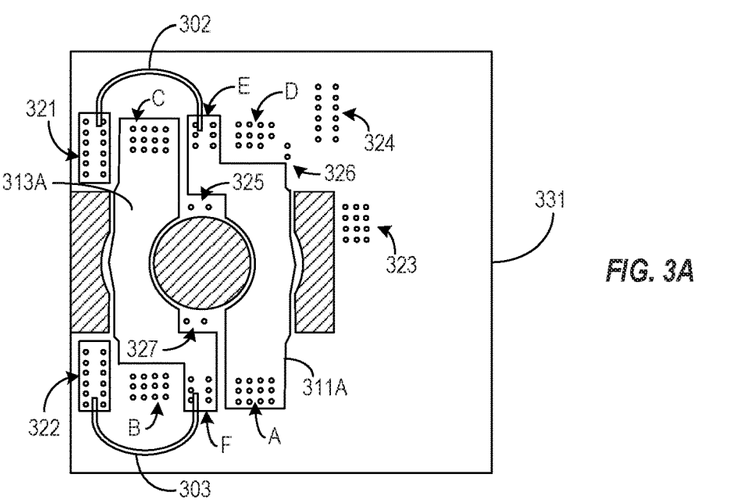
FIGS. 3A-3J illustrate generally example layouts for multiple layers of a multiple-layer planar transformer system according to the present subject matter.

The controller 104 can control the first set of switches (Q1-Q4) and the second set of switches (M5-M8) to provide an output voltage ($V_{OUT}$) different than the input voltage ($V_{IN}$). In the illustrated planar transformer system 100, the output voltage ($V_{OUT}$) is lower than the input voltage ($V_{IN}$) but the subject matter is not so limited. When the planar transformer 101 is operated as a step-down transformer, the controller 104 can control the first set of switches (Q1-Q4) to oscillate a polarity of the input voltage ($V_{IN}$) across the first winding 106. When the planar transformer 101 is operated as a step-down transformer, the controller 104 can synchronize the second set of switches (M5-M8) to extract power from the winding segments of the second winding. In the example system 100, the second det of switches can be controlled with two phase signals (PH1, PH2). Details about how the second set of switches (M5-M8) are controlled in such an example are discussed below with respect to FIG. 3. In certain examples, each second winding 107, 108 can be configured to include one or more taps (E, F) between connected winding segments (111/112 and 113/114). In certain examples, the tap (E, F) between winding segments can allow the output voltage ($V_{OUT}$) to include a step-up or step-down multiplier of the input voltage ($V_{IN}$). In addition, compared to conventional methods and even recent planar techniques, the tap (E, F) between the connected winding segments (111/112 and 113/114) can simplify the overall planar transformer design by using fewer switches. Furthermore, the tap (E, F) between the winding segments also allows for use of output inductors 102, 103 with much lower inductance to smooth the output voltage ($V_{OUT}$). The lower inductance of the output inductors 102, 103 results from the circuit design using parasitic inductance of the other planar transformer components to smooth output ripple in the output voltage ($V_{OUT}$). The output inductors 102, 103 can be coupled between a corresponding tap (E, F) and an output voltage terminal of the planar transformer system 100. In certain examples, the output inductors 102, 103 are air-core inductors.

Figure 2:
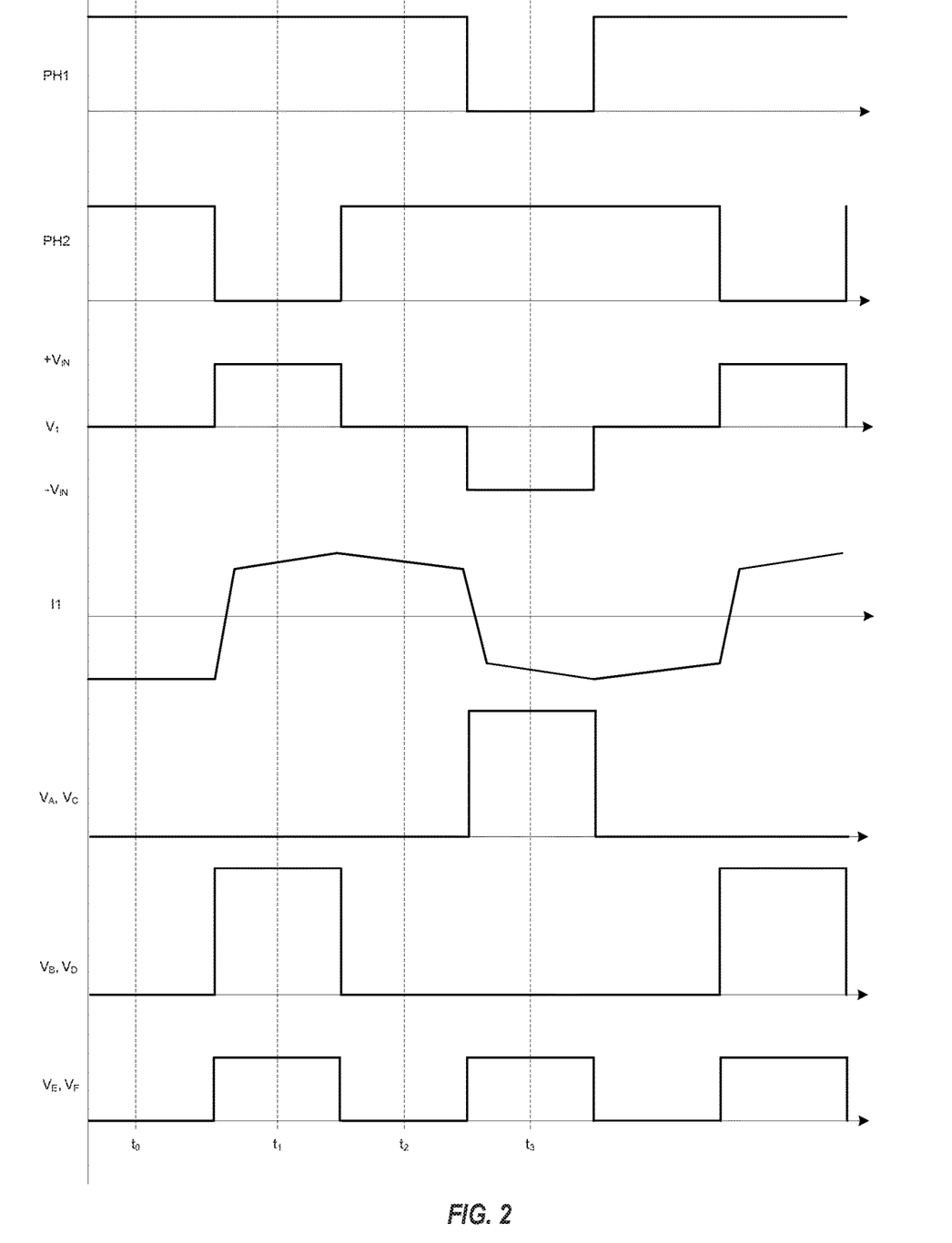
FIG. 2 illustrates generally plots of signal waveforms illustrating the operation of an example planar transformer system.

FIG. 2 illustrates generally plots of signal waveforms illustrating the operation of the planar transformer system of 100 of FIG. 1. The plots include the logic level of the phase 1 (PH1) and phase 2 (PH2) signals that control the switches (M5-M8) of the second winding, the voltage ($V_1$) across the first winding, the current (I1) in the first winding, voltages ($V_A$, $V_B$, $V_C$, $V_D$) at the extreme nodes (A,B,C,D) of the connected winding segments of the second winding, and the voltages at the center taps (E, F) of the connected winding segments.

In general, the winding segments of the second winding are placed in one of three phases to capture a voltage induced by the first winding during the transitions associated with the supply voltage being applied to, or isolated from the first winding. When the supply voltage is applied to, or isolated from, the first winding, the change in current through the first winding can induce a voltage across each second winding segment. By switching the connections of the second winding segments to capture the voltage induced as current polarity of the first winding is changed, a stepped-down DC voltage can be captured at the center taps (E, F) of the connected winding segments, of the second winding. The plot of signals assumes that a logic high places each switch, or transistor, in a low impedance state (e.g., "on") and a logic low places each switch in a high impedance state (e.g., "off"). However, it is understood that switches or transistors responding to logic commands differently are possible and do not depart form the scope of the present subject matter.

For example, at to, the first winding circuit is in a first, free-wheeling state and the second winding circuit has all the switches (M5-M8) "on" (e.g., PH1=PH2="high"), thus, coupling each extreme node (A, B, C, D) of the winding segments to ground. The free-wheeling state of the first winding allows any current in the first winding to continue to flow until terminated by the circuit losses. Any current in the output inductors (e.g., FIG. 1, 102, 103) connected to the center tap nodes (E, F) is discharged to the output terminal, or charges the output voltage ($V_{OUT}$).

At $t_1$, the first winding circuit moves to the second state, and a supply voltage can be applied across the first winding with a first polarity ($+V_{IN}$). The application of the supply voltage ($V_{IN}$) can induce a change in current (I1) of the first winding and a voltage can be induced across the winding segments of the second windings. For example, at or in response to the application of the supply voltage ($+V_{IN}$) on the first winding, the switches (FIG. 1; M6, M8) associated with the phase 2 control signal (PH2) can be turned "off". The change in current (I1) of first winding can induce a voltage at the drains (B, D) of the switches (FIG. 3; M6, M8) associated with the phase 2 control signal (PH2). The magnetic coupling of the planar first and second windings can be quite good such that the induced voltage ($V_B$, $V_D$) of the segments of the second winding can match the sharp, pulse shape of the supply voltage ($V_{IN}$) applied to the first winding. The coupled winding segments for this example each form one complete turn of each second winding. At t1, the phase 2 signal (PH2) is low and the associated switches (M6, M8) are "off". The first winding 106, or primary winding for this step-down application, sees the full change in voltage across the winding terminals (e.g., $2*V_{IN}$). Voltages across the connected winding segments of each of the second windings is given by:

$$V_B = V_D = \frac{2 \cdot V_{IN}}{N \cdot S},$$

Where N is the turns ratio of the primary winding to each individual secondary winding, and S is the number of winding segments in each turn of each secondary winding. As such, the voltages at the center tap nodes can be given by:

$$V_E = V_F = \frac{V_{IN}}{N \cdot S},$$

Assuming a load at the output terminal of the planar transformer system, current in the output inductors 102, 103 can increase due to positive voltage across them.

At $t_2$, the controller can transition the first winding back to the first, free-wheeling state and the second winding circuit has all the switches (M5-M8) "on" (e.g., PH1=PH2="high"), thus, coupling each extreme node of the winding segments of the second windings to ground. As before, any current flowing in the first winding continues to flow because the first winding inductance resists a change in current flow. The current may fall slightly during the free-wheeling state due to losses in the circuit. Any current in the output inductors (e.g., FIG. 1, 102, 103) connected to the center tap nodes (E, F) is discharged to the output terminal, or charges the output voltage ($V_{OUT}$).

At $t_3$, the first winding circuit moves to the third state, and the supply voltage ($V_{IN}$) can be applied across the first winding with a second polarity ($-V_{IN}$). The application of the supply voltage ($V_{IN}$) can induce a change in current (I1) of the first winding and voltage can be induced across segments of the second winding. For example, at or in response to the application of the supply voltage ($-V_{IN}$) on the first winding, the switches (M5, M7) associated with the phase 1 control signal (PH1) can be turned "off". The change in current (I1) of first winding can induce a voltage at the drains (A, C) of the switches (FIG. 3; M5, M7) associated with the phase 1 control signal (PH1). The magnetic coupling of the planar first and second windings can be quite good such that the induced voltage ($V_A$, $V_C$) of the segments of the second winding can match the sharp, pulse shape of the supply voltage ($V_{IN}$) applied to the first winding. At $t_3$, the phase 1 signal (PH1) is low and the associated switches (M5, M7) are "off". The first winding 106, or primary winding for this step-down application, sees the full change in voltage across the winding terminals (e.g., $2*V_{IN}$). Voltages across the connected winding segments of each of the second windings can be given by:

$$V_A = V_C = \frac{2 \cdot V_{IN}}{N \cdot S},$$

Where N is the turns ratio of the primary winding to each individual secondary winding, and S is the number of winding segments in each turn of each secondary winding. As such, the voltages at the center tap nodes can be given by:

$$V_E = V_F = \frac{V_{IN}}{N \cdot S},$$

Assuming a load at the output terminal of the planar transformer system, current in the output inductors 102, 103 can increase due to positive voltage across them.

FIGS. 3A-3J illustrate generally example layouts for multiple layers of a multiple-layer planar transformer system according the present subject matter. In addition, the layouts include notations indicating nodes corresponding to the nodes shown in the example circuit of FIG. 1. IN certain examples, a winding segment can be formed using multiple winding segments coupled in parallel. The planar transformer system example of FIGS. 3A-3X use multiple winding segments coupled in parallel to form a single winding segment as shown in FIG. 1 (e.g., 111, 112, 113, 114). The layouts also use multiple layers to form a single winding segment. The layouts of FIGS. 3A-3X show the conductive traces associated with the planar transformer and area including vias for forming inter-layer connections associated with those conductive traces. Ancillary trace routing to the controller and the switches is not shown.

FIG. 3A illustrates generally a first layer 331 of a multiple-layer planar transformer system. In certain examples, a major surface of the first layer 331 is an exposed as part of the overall system. The first layer includes areas to accommodate a core 306, a first portion 311A of a first winding segment, a first portion 313A of a third winding segment, a via area (A) for coupling directly with the first winding segment, a via area (B) for coupling directly with a second winding segment, a via area (C) for coupling directly with the third winding segment, a via area (D) for coupling directly with a fourth winding segment, a via area for a first center tap node (E), a via area for a second center tap node (F), via areas 323, 324 for terminal connections to the first winding, and via areas 325, 326, 327 for intermediate connections of the first winding. As the first area include an exposed surface, FIG. 3A also shows the output inductors 302, 303. The first output inductor 302 is coupled between the first center tap (E) and a first output node 321. The second output inductor 303 is coupled between the second center tap (F) and a second output node 322. In certain examples, the first and second output nodes 321, 322 are electrically coupled directly together to provide the output voltage (Vou-r).

Figure 3B:
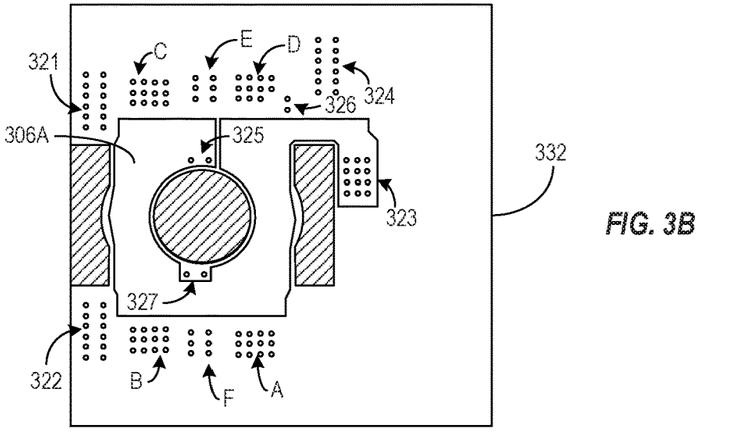

FIG. 3B illustrates generally and second layer 332 of a multiple-layer planar transformer system. The second layer includes first portion 306A of the first winding. The first portion 306A provide conductive traces between vias of a first area 323 of a first terminal node of the first winding and vias of a first intermediate node 325 of the first winding. In certain examples, vias of the first via area 323 can be selectively coupled to a supply rail of the multiple-layer planar transformer system.

Figure 3C:
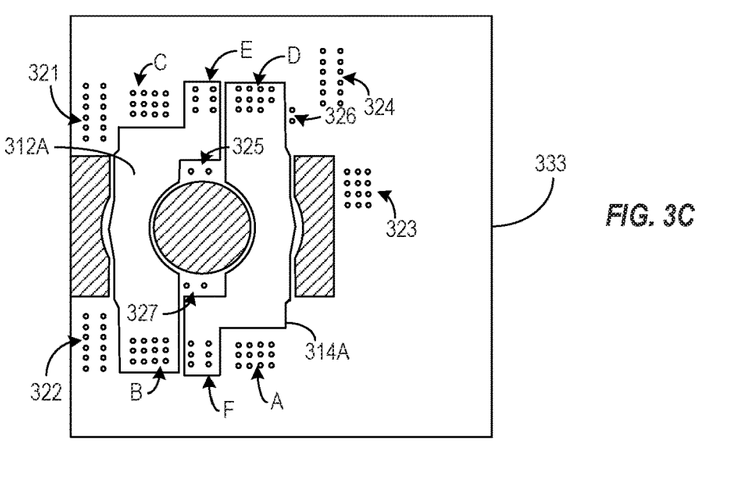

FIG. 3C illustrates generally a third layer 333 of the multiple-layer planar transformer system. The third layer 333 includes areas to accommodate a core 306, a first portion 312A of a second winding segment, a first portion 314A of a fourth winding segment, a via area (A) for coupling directly with the first winding segment, a via area (B) for coupling directly with a second winding segment, a via area (C) for coupling directly with the third winding segment, a via area (D) for coupling directly with a fourth winding segment, a via area for a first center tap node (E), a via area for a second center tap node (F), via areas 323, 324 for terminal connections to the first winding, and via areas 325, 326, 327 for intermediate connections of the first winding.

Figure 3D:
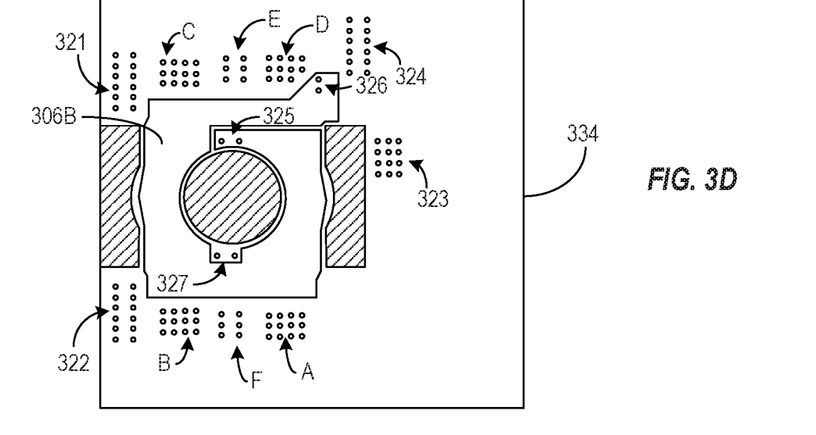

FIG. 3D illustrates generally a fourth layer 334 of a multiple-layer planar transformer system. The fourth layer includes a second portion 306B of the first winding. The second portion 306B provides a conductive trace between vias of first intermediate node area 325 of the first winding and vias of a second intermediate node 326 of the first winding.

Figure 3E:
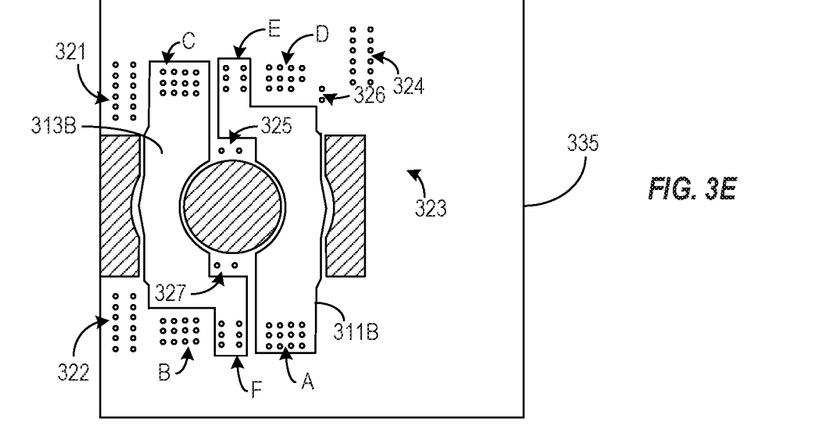

FIG. 3E illustrates generally a fifth layer 335 of a multiple-layer planar transformer system. The fifth layer includes areas to accommodate a core 306, a second portion 311B of a first winding segment, a second portion 313B of a third winding segment, a via area (A) for coupling directly with the first winding segment, a via area (B) for coupling directly with a second winding segment, a via area (C) for coupling directly with the third winding segment, a via area (D) for coupling directly with a fourth winding segment, a via area for a first center tap node (E), a via area for a second center tap node (F), via areas 323, 324 for terminal connections to the first winding, and via areas 325, 326, 327 for intermediate connections of the first winding.

Figure 3F:
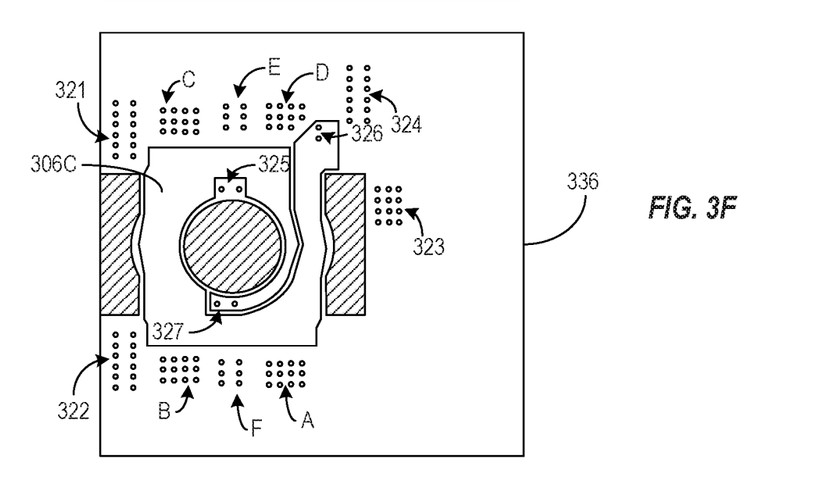

FIG. 3F illustrates generally a sixth layer 336 of a multiple-layer planar transformer system. The sixth layer includes a third portion 306C of the first winding. The third portion 306C provides a conductive trace between vias of second intermediate node area 326 of the first winding and vias of a third intermediate node 327 of the first winding.

Figure 3G:
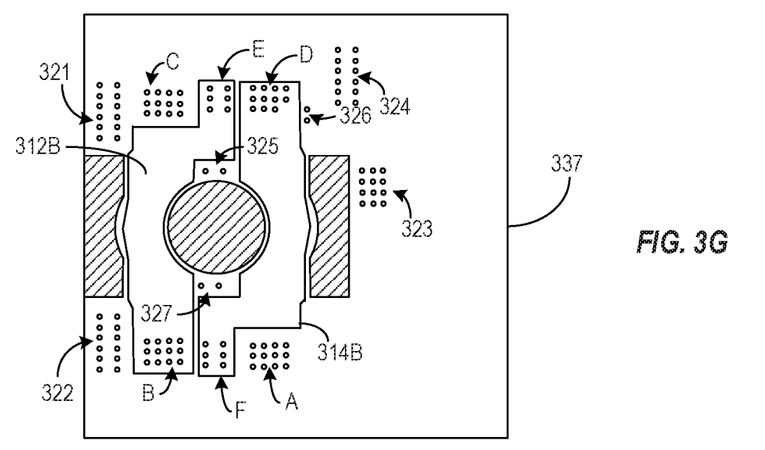

FIG. 3G illustrates generally a seventh layer 337 of the multiple-layer planar transformer system. The seventh layer 337 includes areas to accommodate a core 306, a second portion 312B of a second winding segment, a second portion 314B of a fourth winding segment, a via area (A) for coupling directly with the first winding segment, a via area (B) for coupling directly with a second winding segment, a via area (C) for coupling directly with the third winding segment, a via area (D) for coupling directly with a fourth winding segment, a via area for a first center tap node (E), a via area for a second center tap node (F), via areas 323, 324 for terminal connections to the first winding, and via areas 325, 326, 327 for intermediate connections of the first winding.

Figure 3H:
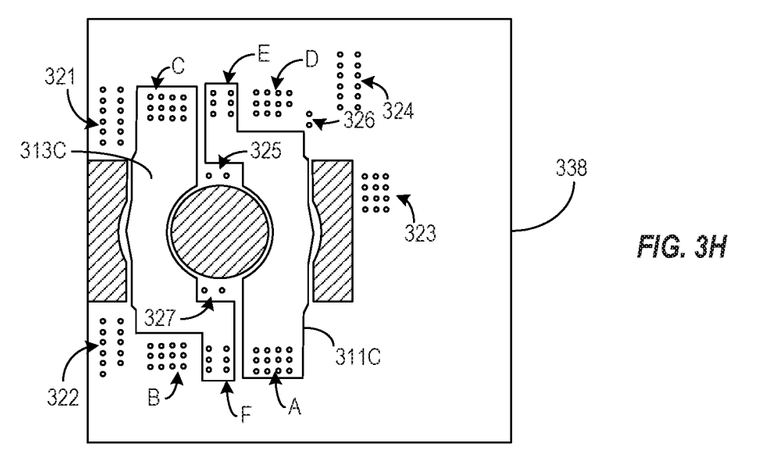

FIG. 3H illustrates generally an eighth layer 338 of a multiple-layer planar transformer system. The eighth layer 338 includes areas to accommodate a core 306, a third portion 311C of a first winding segment, a third portion 313C of a third winding segment, a via area (A) for coupling directly with the first winding segment, a via area (B) for coupling directly with a second winding segment, a via area (C) for coupling directly with the third winding segment, a via area (D) for coupling directly with a fourth winding segment, a via area for a first center tap node (E), a via area for a second center tap node (F), via areas 323, 324 for terminal connections to the first winding, and via areas 325, 326, 327 for intermediate connections of the first winding.

Figure 3I:
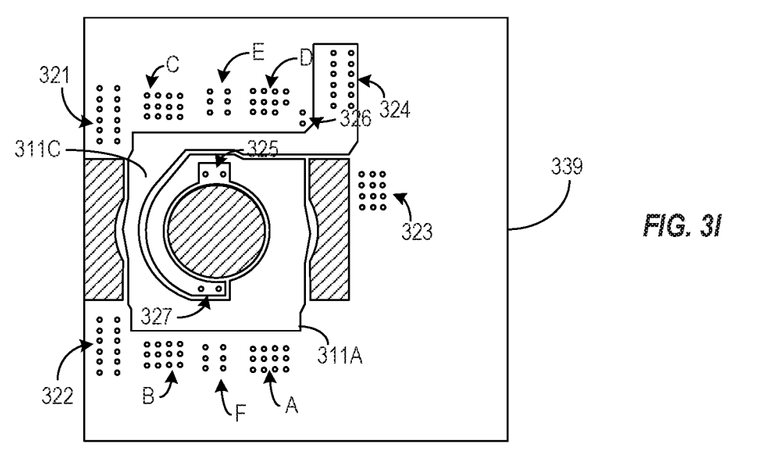

FIG. 3I illustrates generally a ninth layer 339 of a multiple-layer planar transformer system. The ninth layer includes a fourth portion 306D of the first winding. The Fourth portion 306D provides a conductive trace between vias of the third intermediate node area 327 of the first winding and vias of a second area 324 of a second terminal node of the first winding. In certain examples, vias of the via area 324 of the second terminal node can be selectively coupled to a supply rail of the multiple-layer planar transformer system.

Figure 3J:
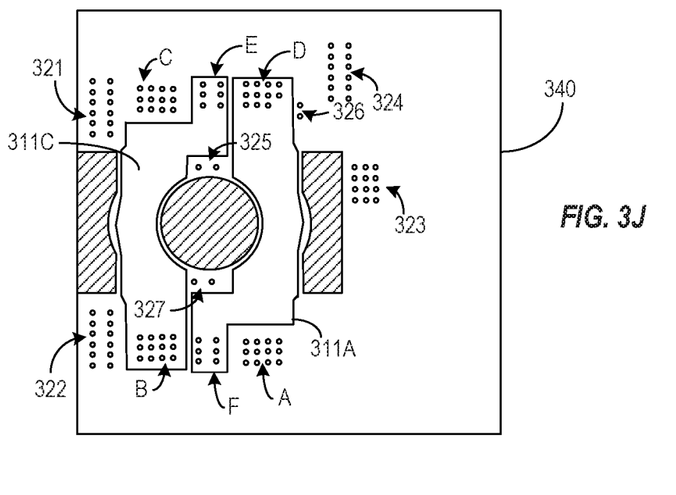

FIG. 3J illustrates generally a tenth layer 340 of the multiple-layer planar transformer system. The tenth layer 340 includes areas to accommodate a core 306, a third portion 312C of a second winding segment, a third portion 314C of a fourth winding segment, a via area (A) for coupling directly with the first winding segment, a via area (B) for coupling directly with a second winding segment, a via area (C) for coupling directly with the third winding segment, a via area (D) for coupling directly with a fourth winding segment, a via area for a first center tap node (E), a via area for a second center tap node (F), via areas 323, 324 for terminal connections to the first winding, and via areas 325, 326, 327 for intermediate connections of the first winding.

Figure 4A:
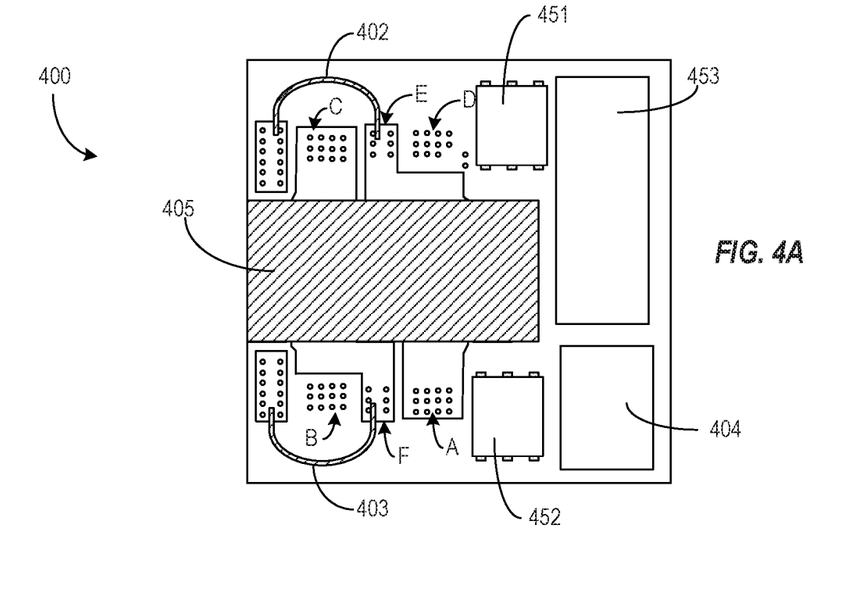
FIGS. 4A-4C illustrate generally an example physical implementation of a multiple-layer planar transformer according to the present subject matter.
Figure 4B:
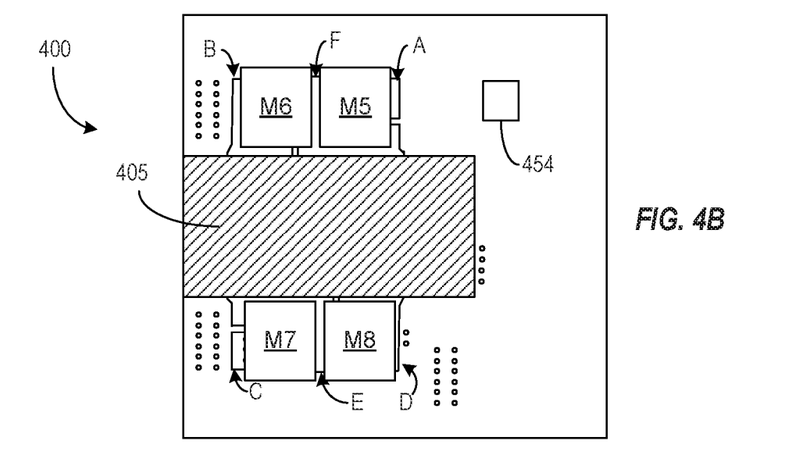
Figure 4C:
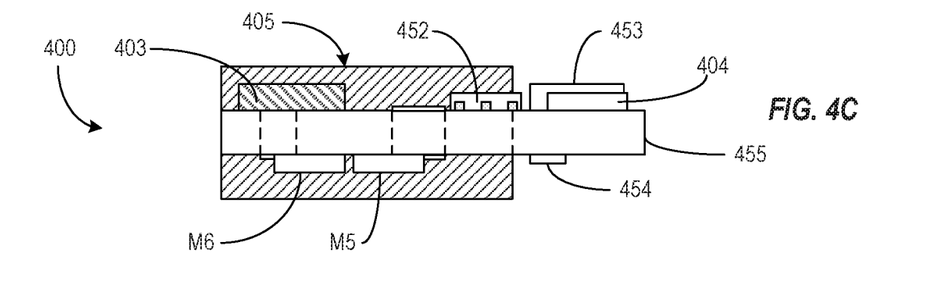

FIGS. 4A-4C illustrate generally an example physical implementation 400 of a multiple-layer planar transformer according to the present subject matter. FIG. 4A illustrates generally a top-view of the implementation 400. Visible in the top view are the output inductors 402, 403, the top of the core 405, integrated circuits 451, 452 including drivers for the second set of switches, an integrated circuit 453 including switches for the full bridge of the first winding first set of switches, an a digital PWM controller 404. FIG. 4B illustrates generally a bottom view of the example physical implementation 400. Visible in the bottom view are the bottom of the core 405, the switches (M5, M6, M7, M8) for the second winding, an integrated circuit 454 including an analog switch for current sensing, and a multiple layer substrate 455. FIGS. 4A and 4B illustrate generally the locations of various terminals (A, B, C, D, E, F) of the physical implementation 400 of an example multiple-layer planar transformer system. FIG. 4C illustrates a side view of the example physical implementation 400. It is understood that the example physical implementation 400 illustrates only some of the components of a multiple-layer planar transformer and that the layout can include additional ancillary components such a resistor, capacitors, diodes, etc. without departing from the scope of the present subject matter.

Figure 5:
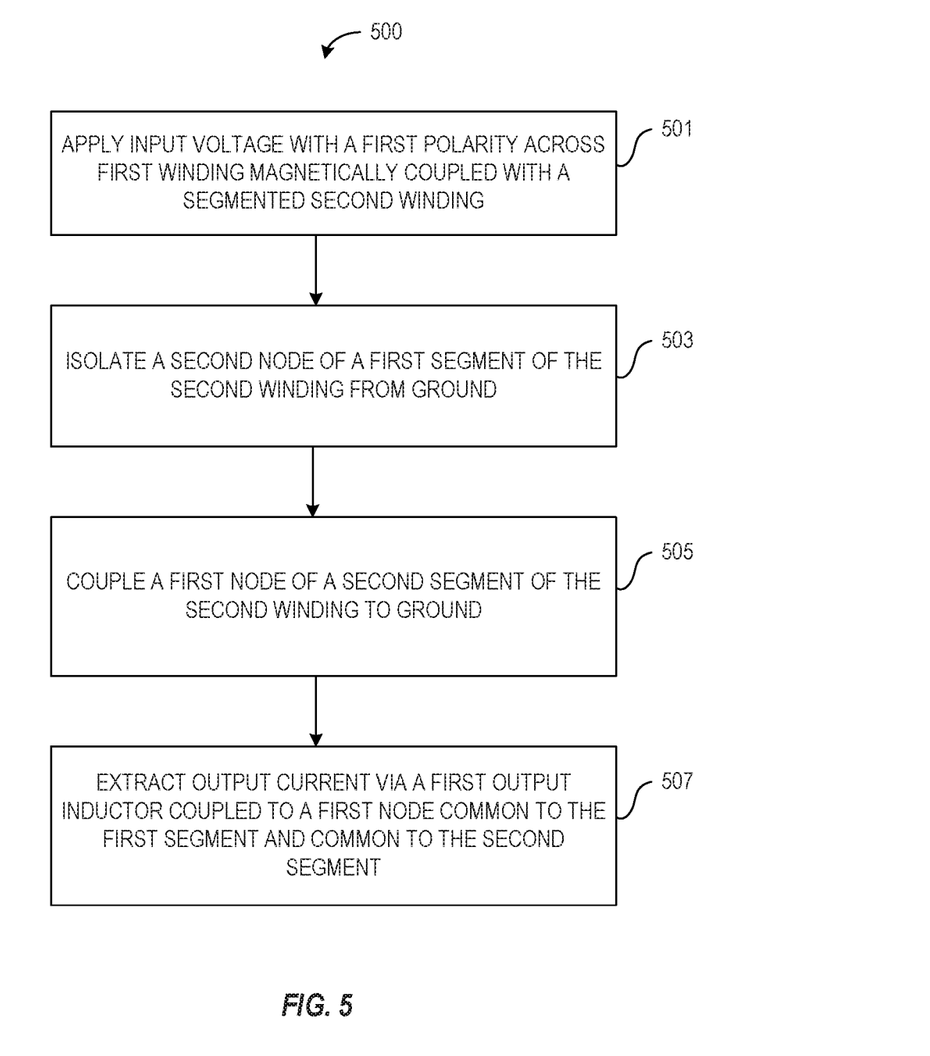
FIG. 5 illustrates generally a flowchart of an example method of operating a multiple-layer planar transformer with center taps of a segmented winding.

FIG. 5 illustrates generally a flowchart of an example method 500 of operating a multiple-layer planar transformer. At 501, an input voltage with a first polarity can be applied across a first winding of the multiple-layer planar transformer. At 503, in response to the voltage and polarity applied to the first winding, a first node of a first segment of a second, segmented winding can be electrically isolated from ground. In certain examples, a first transistor can couple the first node of the first segment to, and isolate the first node from, ground. At 505, a first node of a second segment of the second winding can be electrically coupled to ground. In certain examples, a second transistor can be used to couple the first node of the second segment to or isolate it from, ground. In certain examples, the first segment of the second winding forms only a portion of a conductive path of a single turn of the second winding, and the second segment of the second winding forms only a portion of a conductive path of a single turn of the second winding. The first segment and the second segment can be coupled in series at a first node common to both the first segment and to the second segment. At 507, varying magnetic field associated with the first winding can induce a voltage across the segments of the second winding and an output current can be extracted via a first output inductor having a first node coupled to a node common to the first segment and to the second segment. In certain examples, each segment of the second winding can include conductive traces of several layers of the multiple-layer transformer coupled in parallel.

A second phase of the method can include applying the input voltage across the first winding with opposite polarity, isolating the first node of the second segment from ground, coupling the first node of the first segment to ground, and extracting the output current via the first output inductor. In certain examples, the multiple layer planar transformer can include an additional second winding having a first segment, second segment, first transistor, second transistor and a second output inductor having a first node coupled to a node common to both the first and second segment of the additional second winding. The second node of the first output inductor and the second output inductor can be coupled together to form an output terminal of the multiple-layer planar transformer. Execution of the method of FIG. 5 with the additional second winding and second output inductor can increase the current supplied by the multiple-layer planar transformer.

A third phase of the method can occur during an idle period, or freewheeling mode, between applications of the input voltage to the first winding. During the idle period, both nodes of the first winding can both be coupled to one of the input voltage supply rails such that the nodes are coupled together. The current in the first winding can freewheel with the nodes of the first winding coupled together. Also, during the idle period, the first nodes of each segment of each second winding can be coupled to ground. As such, output current of each output inductor can be discharged to the output terminal of the multiple-layer transformer.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A coupled inductor circuit comprising;
   a first winding comprising a conductive coil having an electrical path defining and encircling a central axis;
   a second winding configured to magnetically couple with the first winding, the second winding having a plurality of individual segments, wherein each individual segment forms a fraction of one turn of the second winding;
   a first switch configured to selectively couple a first supply rail of the coupled inductor circuit with a first node of a first individual segment of the plurality of individual segments;
   a second switch configured to selectively couple the first supply rail of the coupled inductor circuit with a first node of a second individual segment of the plurality of individual segments; and
   a first output inductor coupled to a first common node of the second winding;
   wherein the first common node directly couples a second node of the first individual segment with a second node of the second individual segment.

2. The coupled inductor circuit of claim 1, wherein the first individual segment and the second individual segment define a first conductive path about a majority of the central axis.

3. The coupled inductor circuit of claim 2, wherein the first conductive path does not completely encircle the central axis.

4. The coupled inductor circuit of claim 1, including a third winding configured to magnetically couple with the first winding, the third winding having a second plurality of individual segments, wherein each individual segment of the second plurality of individual segments forms a fraction of one turn of the third winding.

5. The coupled inductor circuit of claim 4, including a second output inductor coupled to a first common node of the third winding.

6. The coupled inductor circuit of claim 5, wherein the central axis is located between the first common node of the second winding and the first common node of the third winding.

7. The coupled inductor circuit of claim 5, wherein the first common node of the third winding directly couples a first node of a first individual segment of the second plurality of individual segments with a first node of a second individual segment of the second plurality of individual segments.

8. The coupled inductor circuit of claim 7, wherein the first individual segment of the second plurality of individual segments and the second individual segment of the second plurality of individual segments define a second conductive path about a majority of the central axis.

9. The coupled inductor circuit of claim 8, wherein the second conductive path does not completely encircle the central axis.

10. The coupled inductor circuit of claim 7, including a first switch configured to selectively couple a second node of the first individual segment of the second plurality of individual segments with a first supply rail of the coupled inductor circuit.

11. The coupled inductor circuit of claim 10, including a second switch configured to selectively couple a second node of the second individual segment of the second plurality of individual segments with the first supply rail of the coupled inductor circuit.

12. A method for operating a multiple-layer planar transformer, the method comprising:
- applying an input voltage having a first polarity across a first winding to provide a first activation of the first winding, the first winding magnetically coupled to a second winding;
- isolating a first node of a first segment of the second winding from a ground reference in response to the first activation;
- coupling a first node of a second segment of the second winding to the ground reference;
- extracting output current via a first output inductor coupled to a first node common to the first segment and the second segment to provide an output voltage;
- wherein the first segment forms a first portion of a first turn of the second winding; and
- wherein the second segment forms a second portion of the first turn of the second winding.

13. The method of claim 12, including applying zero volts across the first winding in response to a conclusion of the first activation to provide a first freewheeling mode of the first winding.

14. The method of claim 13, including coupling the first node of the first winding to zero in response to the first freewheeling mode; and
- discharging current of the first output inductor to provide the output voltage.

15. The method of claim 14, including:
- applying the input voltage having a second polarity across the first winding to provide a second activation of the first winding;
- isolating the first node of a second segment of the second winding from the ground reference in response to the second activation;
- coupling the first node of the first segment of the second winding to the ground reference; and
- extracting output current via the first output inductor coupled to the first node to provide the output voltage.

16. A system comprising:
- a load;
- a multiple-layer planar transformer configured to provide power to the load, the multiple-layer planar transformer including:
- a first winding comprising a conductive coil having an electrical path defining and encircling a central axis;
- a second winding configured to magnetically couple with the first winding, the second winding having a plurality of individual segments, wherein each individual segment forms a fraction of one turn of the second winding;
- a first output inductor coupled to a first common node of two segments of the second winding;
- a first switch configured to selectively couple a first supply rail with a first node of a first individual segment of the plurality of individual segments; and
- a second switch configured to selectively couple the first supply rail with a first node of a second individual segment of the plurality of individual segments.

17. The system of claim 16, wherein the first output inductor is an air-core inductor.

18. The system of claim 16, including:
- an additional second winding configured to magnetically couple with the first winding, the additional second winding having a second plurality of individual segments, wherein each individual segment of the second plurality of individual segments forms a fraction of one turn of the additional second winding;
- a second output inductor coupled to a first common node of two segments of the additional second winding; and
- wherein a node of the first output inductor is coupled to a node of the second output inductor to provide an output node to provide the power to the load.

* * * * *